(12) United States Patent
Lauter et al.

(10) Patent No.: US 8,548,160 B2
(45) Date of Patent: Oct. 1, 2013

(54) DETERMINATION OF PAIRINGS ON A CURVE USING AGGREGATED INVERSIONS

(75) Inventors: Kristin Lauter, Redmond, WA (US); Peter Montgomery, Bellevue, WA (US); Michael Naehrig, Stolberg (DE)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 12/686,707

(22) Filed: Jan. 13, 2010

(65) Prior Publication Data

US 2011/0170684 A1 Jul. 14, 2011

(51) Int. Cl.
*G06F 21/00* (2013.01)

(52) U.S. Cl.
USPC .......................................................... 380/28

(58) Field of Classification Search
USPC ................. 713/150, 156, 175, 176, 177, 178, 713/180; 726/4, 5, 6, 7, 8, 9, 10; 380/28, 380/30, 277, 278, 282, 283, 284, 285
See application file for complete search history.

(56) References Cited

U.S. PATENT DOCUMENTS

| | | | |
|---|---|---|---|
| 6,252,959 B1 | 6/2001 | Paar et al. | |
| 6,266,688 B1 | 7/2001 | Aoki et al. | |
| 6,490,352 B1 | 12/2002 | Schroeppel | |
| 6,782,100 B1 | 8/2004 | Vanstone | |
| 7,046,801 B2 | 5/2006 | Okeya | |
| 7,079,650 B1 | 7/2006 | Knudsen | |
| 7,412,062 B2 | 8/2008 | Lambert | |
| 7,702,105 B1 * | 4/2010 | Gura et al. | 380/255 |
| 2003/0059043 A1 | 3/2003 | Okeya | |
| 2004/0114756 A1* | 6/2004 | Moller et al. | 380/30 |
| 2007/0098154 A1 | 5/2007 | Antipa | |
| 2008/0016346 A1* | 1/2008 | Harrison et al. | 713/168 |
| 2008/0219438 A1* | 9/2008 | Ebeid | 380/30 |

OTHER PUBLICATIONS

Mishra et al., "Application of Montgomery's Trick to Scalar Multiplication for Elliptic and Hyperelliptic Curves Using a Fixed Base Point", Mar. 1-4, 2004, Public Key Cryptography—PKC 2004, 7th International Workshop on Theory and Practice in Public Key Cryptography, Singapore, vol. 2947, pp. 41-54.*

Dahmen et al., "Affine Precomputation with Sole Inversion in Elliptic Curve Cryptography", 2007, In Proceedings of the 12th Australasian conference on Information security and privacy (ACISP'07), Josef Pieprzyk, Hossein Ghodosi, and Ed Dawson (Eds.). Springer-Verlag, Berlin, Heidelberg, 245-258).*

"International Search Report", Mailed Date: Aug. 22, 2011, Application No. PCT/US2010/062656, Filed Date: Dec. 31, 2010, pp. 11.

Kwon; Soonhak, "Efficient Tate Pairing Computation for Supersingular Elliptic Curves over Binary Fields"—Published: 2004 http://citeseerx.ist.psu.edu/viewdoc/download?doi=10.1.1.58.7577&rep=rep1&type=pdf.

(Continued)

*Primary Examiner* — Eleni Shiferaw
*Assistant Examiner* — Hilary Branske
(74) *Attorney, Agent, or Firm* — Microsoft Corporation

(57) ABSTRACT

One or more techniques and/or systems are disclosed that provide for determining mathematical pairings for a curve for use in cryptography. A plurality of inversions used for determining the mathematical pairings for the curve are aggregated (e.g., into a single inversion in respective levels of a binary tree representation of elements of the computation). The mathematical pairings for the curve are determined in affine coordinates from a binary representation of a scalar read from right to left using the aggregated plurality of inversions.

20 Claims, 8 Drawing Sheets

(56) References Cited

OTHER PUBLICATIONS

Arene et al., "Faster Pairing Computation"—Published: Jun. 8, 2009 http://www.hyperelliptic.org/tanja/vortraege/edpairing.pdf.

Ciet et al., "Trading Inversions for Multiplications in Elliptic Curve Cryptography"—Retrieved Date: Sep. 18, 2009 http://joye.site88.net/papers/CJLM06trading.pdf.

* cited by examiner

DETERMINATION OF PAIRINGS ON A CURVE USING AGGREGATED INVERSIONS

BACKGROUND

Computers have become increasingly interconnected via networks (such as the Internet), and security and authentication concerns have become increasingly important. Cryptographic techniques that involve a key-based cipher, for example, can take sequences of intelligible data (e.g., typically referred to as plaintext) that form a message and mathematically transform them into seemingly unintelligible data (e.g., typically referred to as ciphertext), through an enciphering process. In this example, the enciphering can be reversed, thereby allowing recipients of the ciphertext with an appropriate key to transform the ciphertext back to plaintext, while making it very difficult, if not nearly impossible, for those without the appropriate key from recovering the plaintext.

Public-key cryptographic techniques are an embodiment of key-based cipher. In public-key cryptography, for example, respective communicating parties have a public/private key pair. The public key of each respective pair is made publicly available (e.g., or at least available to others who are intended to send encrypted communications), and the private key is kept secret. In order to communicate a plaintext message using encryption to a receiving party, for example, an originating party can encrypt the plaintext message into a ciphertext message using the public key of the receiving party and communicate the ciphertext message to the receiving party. In this example, upon receipt of the ciphertext message, the receiving party can decrypt the message using its secret private key, thereby recovering the original plaintext message.

An example of public/private key cryptology comprises generating two large prime numbers and multiplying them together to get a large composite number, which is made public. In this example, if the primes are properly chosen and large enough, it may be extremely difficult (e.g., practically impossible due to computational infeasibility) for someone who does not know the primes to determine them from just knowing the composite number. However, in order for this method to be secure, the size of the composite number should be more than 1,000 bits. In some situations, such a large size makes the method impractical to be used.

An example of authentication is where a party or a machine attempts to prove that it is authorized to access or use a product or service. Often, a product ID system is utilized for a software program(s), where a user enters a product ID sequence stamped on the outside of the properly licensed software package as proof that the software has been properly paid for. If the product ID sequence is too long, then it will be cumbersome and user unfriendly. Other common examples include user authentication, when a user identifies themselves to a computer system using an authentication code.

As another example, in cryptography, elliptic curves are often used to generate cryptographic keys. An elliptic curve is a mathematical object that has a structure and properties well suited for cryptography. Many protocols for elliptic curves have already been standardized for use in cryptography. A recent development in cryptography involves using a pairing, where pairs of elements from one or more groups, such as points on an elliptic curve, can be combined to generate new elements from another group to create a cryptographic system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Encryption and decryption are usually performed based on a secret. This secret can utilize an order of a group of points, or some other characteristic of the group, such as the generator, or a multiple of the generator. A variety of different groups can be used in cryptography, such as implementing the points on an elliptic curve for the group's elements. A group of elements (e.g., points) derived from an elliptic curve can be used in the encryption/decryption, for example, as the discrete logarithm problem (DLP) for such a group is considered to be hard. A hard DLP is preferred in cryptography in order to create a secure encryption/decryption process, for example.

Currently, when computing pairings on an elliptic curve a lot of operations such as multiplications or inversions in the finite field that the elliptic curve is defined over can be required. One can attempt to reduce the number of multiplications to reduce computation expense, and/or speed the computations up in other ways. One technique for speeding up the computations is to reduce a number of inversions undertaken when computing the pairing.

For example, when working in affine space, both multiplications and inversions are performed, where inversions are more computationally expensive than multiplications. In order to reduce the number of inversions current practitioners change the coordinate system of the curve points from affine space to projective space. This has an effect of reducing the inversions, while increasing the number of multiplications, which are computationally cheaper.

One or more of the techniques and/or systems described herein provide an alternate to converting the coordinates to projective space, while still reducing a number of inversions needed to compute the pairing on the elliptic curve. Using these techniques and systems one may aggregate inversions for coordinates in affine space, for example, and reuse the aggregated inversions for an additive act used for the pairing computation. Further, portions of the computations can be parallelized on multi-core systems, for example, to speed up the overall computation time. In this way, for example, pairings used in a cryptographic system can be computed using less computational resources and in a shorter time (e.g., faster) than present implementations.

In one embodiment, when determining mathematical pairings for a curve for use in cryptography, a plurality of inversions that are used when determining the mathematical pairings for the curve are aggregated (e.g., into a single inversion, such as an intermediate calculation in the pairings computation). The mathematical pairings for the curve are determined in affine coordinates along a binary representation of a scalar read from right to left using the aggregated plurality of inversions.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
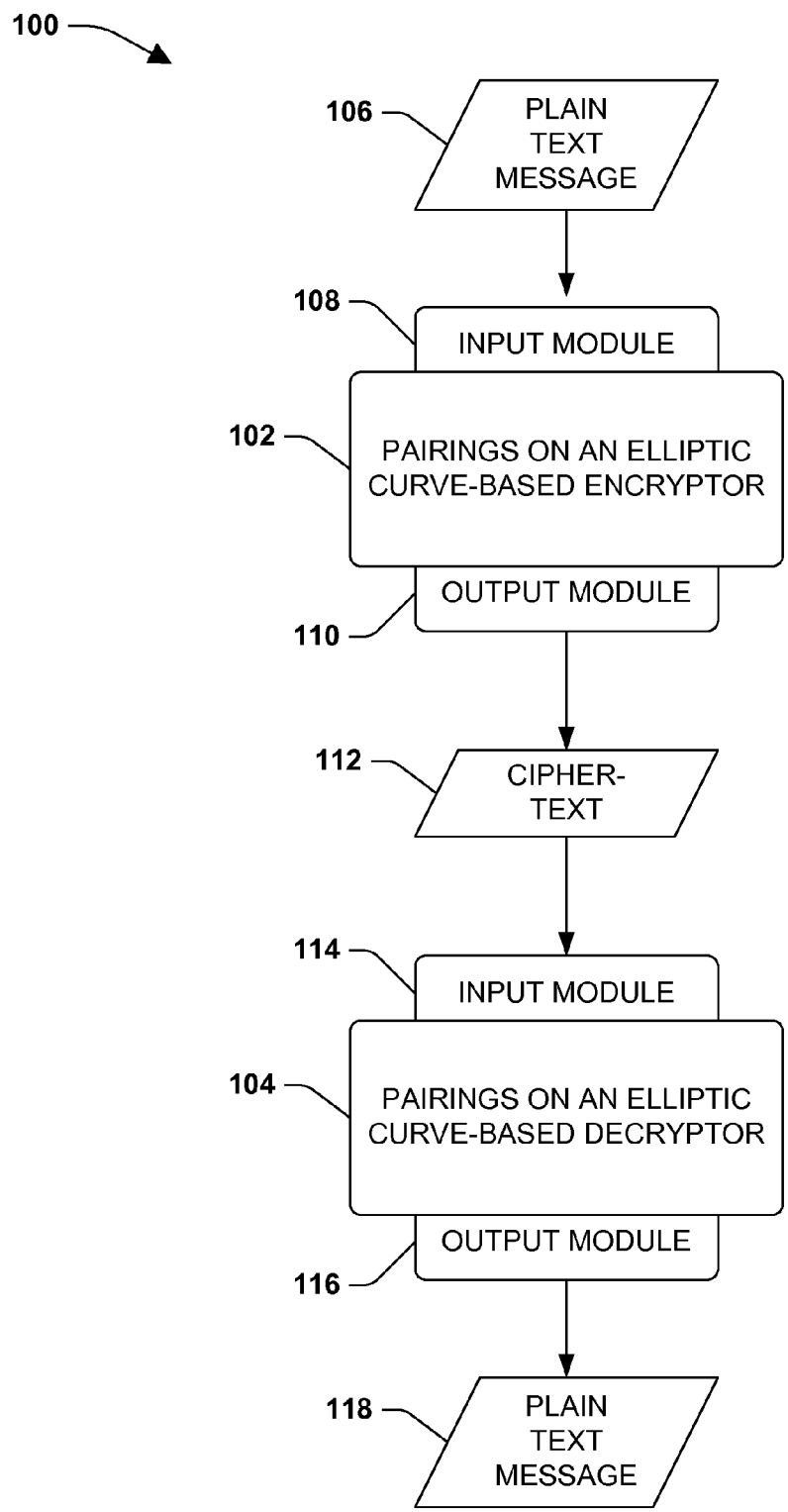
FIG. 1 is a block diagram illustrating an exemplary cryptosystem in accordance with one or more of the methods and/or systems disclosed herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The one or more cryptographic pairings techniques and/or systems described herein can determine mathematical pairings for an elliptic curve that can be used for cryptographic applications. For example, they can be used to determine pairings for a proposed authorization (e.g., an electronic signature) for cryptographic applications.

Typically, a pairing-based cryptosystem utilizes a group (e.g., of elements and a binary multiplier derived from an elliptic curve) whose elements are publicly known (e.g., by knowing the curve). The scalar that is used to compute the pairing is publicly known. Unknown secrets are either the input points or implicitly contained in the input points to the pairing. The basis for the security is the hardness of an associated discrete logarithm problem. A pairing-based encryption and decryption as illustrated in FIG. 1, as an example, typically refers to encryption and decryption that uses keys that are generated based on aspects or characteristics of an algebraic curve. The exemplary cryptosystem of FIGS. 1 and 2 can be based on the curve being publically known but the points generated being secret, as the points generated from the curve by the scalar are secret (e.g., and difficult to determine). In one embodiment of the pairing-based cryptography, the curve may be an elliptic curve, and the elements that comprise the group can be generated from points on the elliptic curve. As one of ordinary skill in the art may appreciate, in a typical situation a point P is publicly known and a scalar m is secret. Then a point Q=mP is made public as well. Because an associated discrete log problem is hard, it is infeasible to determine m from P and Q. Accordingly, the secrets are usually just the scalars and the points are public.

Pairing-based cryptosystems can be used to encrypt a wide variety of information. For example, a cryptosystem may be used to generate a "short" signature or product identifier, which is a code that allows validation and/or authentication of a machine, program or user, for example. The signature can be a "short" signature in that it uses a relatively small number of characters.

FIG. 1 is a block diagram illustrating an exemplary cryptosystem 100 in accordance with certain embodiments of the methods and systems disclosed herein. The exemplary cryptosystem 100 comprises an encryptor 102 and a decryptor 104. A plaintext message 106 can be received at an input module 108 of the encryptor 102, which is a pairing-based encryptor that encrypts message 106 based on a public key—an element of a publicly known group—generated based on a secret scalar (known merely by decryptor 104). In one embodiment, the group can be a group of points generated from the elliptic curve used by the encryptor 102, and discussed in more detail below. A plaintext message 106 is typically an unencrypted message, although encryptor 102 can encrypt other types of messages. Thus, the message 106 may alternatively be encrypted or encoded by some other component (not shown) or a user.

An output module 110 of the encryptor 102 outputs an encrypted version of the plaintext message 106, which can be ciphertext 112. Ciphertext 112, which may comprise a string of unintelligible text or some other data, can then be communicated to the decryptor 104, which can be implemented, for example, on a computer system remote from a computer system on which encryptor 102 is implemented. Given the encrypted nature of ciphertext 112, the communication link between the encryptor 102 and the decryptor 104 need not be secure (e.g., it is often presumed that the communication link is not secure). As an example, the communication link can be one of a wide variety of public and/or private networks implemented using one or more of a wide variety of conventional public and/or proprietary protocols, and including both wired and wireless implementations. Additionally, the communication link may include other non-computer network components, such as hand-delivery of media including ciphertext or other components of a product distribution chain.

The decryptor 104 receives the ciphertext 112 at an input module 114 and, because the decryptor 104 is aware of the secret key corresponding to the public key used to encrypt the message 106 (e.g., as well as the necessary generator), can decrypt the ciphertext 112 to recover the original plaintext message 106, which is output by an output module 116 as a plaintext message 118. In one embodiment, the decryptor 104 is a pairing-based decryptor that decrypts the message based on the group of points generated from the elliptic curve (e.g., a group as was used by encryptor 102), and is discussed in more detail below.

In one embodiment, the encryption and decryption are performed in the exemplary cryptosystem 100 based on a secret, which may be the scalar used to generate the public key, an element of a group of points from the elliptic curve, thereby allowing the solution to the problem to be difficult to determine. The secret is known to the decryptor 104, and a public key can be generated based on the secret known to encryptor 102. In this embodiment, this knowledge may allow the encryptor 102 to encrypt a plaintext message that can be subsequently decrypted merely by the decryptor 104. Other components, including the encryptor 102, which do not have knowledge of the secret, cannot decrypt the ciphertext (e.g., although decryption may be technically possible, it is not computationally feasible). Similarly, in one embodiment, the decryptor 104 may also generate a message using the secret key based on a plaintext message; a process referred to as digitally signing the plaintext message. In this embodiment, the signed message can be communicated to other components, such as the encryptor 102, which can verify the digital signature based on the public key.

Figure 2:
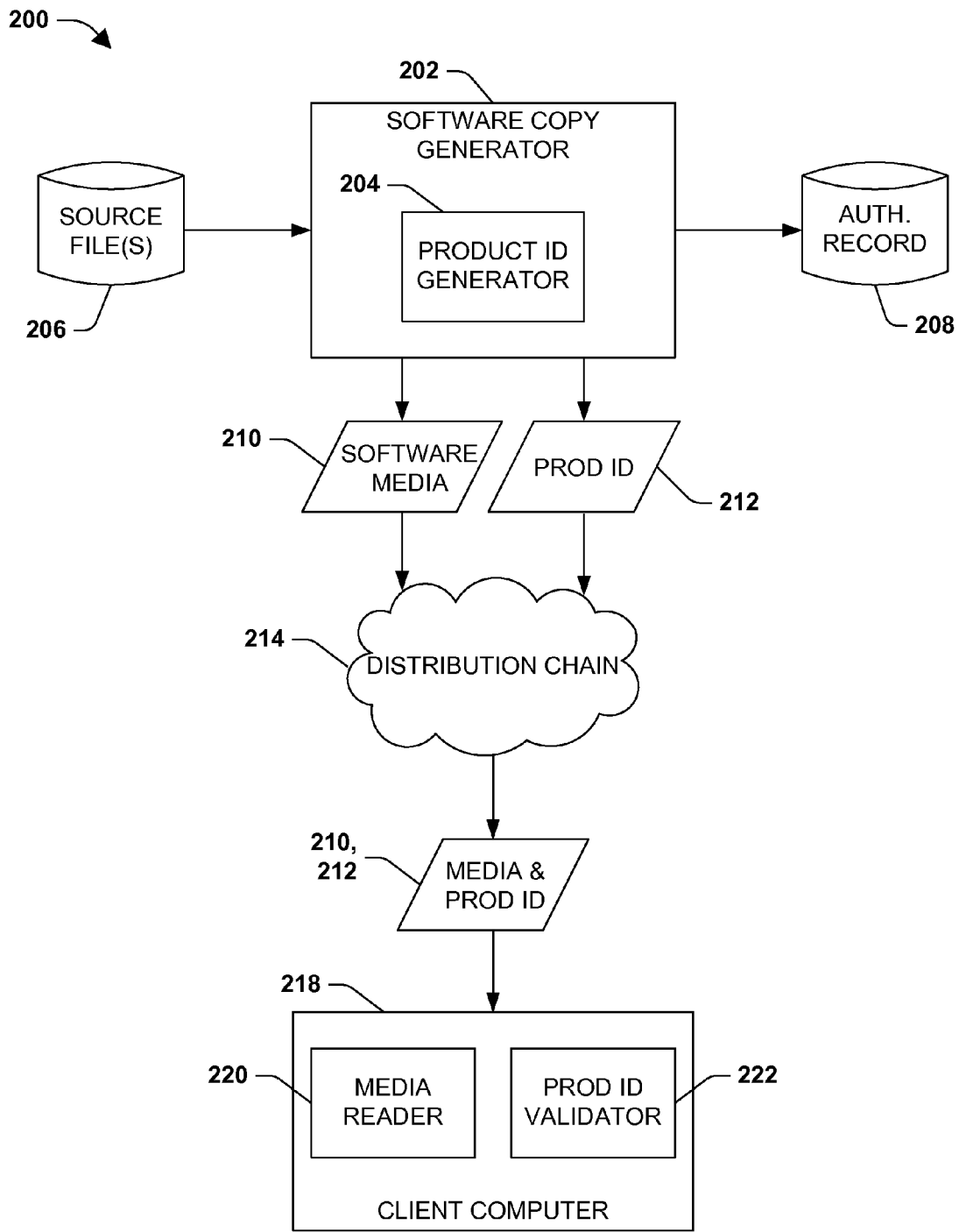
FIG. 2 is an illustration of an exemplary system using a product identifier to validate software.

FIG. 2 is an illustration of an exemplary system 200 using a product identifier to validate software in accordance with certain embodiments of the methods and systems described herein. The exemplary system comprises a software copy generator 202 including a product identifier (ID) generator 204. Software copy generator 202 may produce software media 210 (e.g., a CD-ROM, DVD (Digital Versatile Disk), etc.) that can contain files needed to collectively implement a complete copy of one or more application programs, (e.g., a word processing program, a spreadsheet program, an operating system, a suite of programs, and so forth). These files can be received from source files 206, which may be a local source (e.g., a hard drive internal to generator 202), a remote source (e.g., coupled to generator 202 via a network), or a combination thereof. Although a single generator 202 is illustrated in FIG. 2, often multiple generators operate individually and/or cooperatively to increase a rate at which software media 210 can be generated.

A product ID generator 204 can generate a product ID 212 that may include numbers, letters, and/or other symbols. The generator 204 generates a product ID 212 using the pairing-based encryption techniques and/or systems described herein. The product ID 212 may be printed on a label and affixed to either a carrier containing software media 210 or a box into which software media 210 is placed. Alternatively, the product ID 212 may be made available electronically, such as a certificate provided to a user when receiving a softcopy of the application program via an on-line source (e.g., downloading of the software via the Internet). The product ID 212 can serve multiple functions, such as being cryptographically validated to verify that the product ID is a valid product ID (e.g., thus allowing the application program to be installed). As a further example, the product ID 212 may serve to authenticate the particular software media 210 to which it is associated.

The generated software media 210 and associated product ID 212 can be provided to a distribution chain 214. The distribution chain 214 can represent one or more of a variety of conventional distribution systems and methods, including possibly one or more "middlemen" (e.g., wholesalers, suppliers, distributors, retail stores (either on-line or brick and mortar), etc.), and/or electronic distribution, such as over the Internet. Regardless of the manner in which media 210 and the associated product ID 212 are distributed, the media 210 and product ID 212 are typically purchased by (e.g., licensed) or distributed to, the user of a client computer 218, for example.

The client computer 218 can include a media reader 220 that is capable of reading the software media 210 and installing an application program onto client computer 218 (e.g., installing the application program on to a hard disk drive or memory (not shown) of client computer 218). In one embodiment, part of the installation process can involve entering the product ID 212 (e.g., to validate a licensed copy). This entry may be a manual entry (e.g., the user typing in the product ID via a keyboard), or alternatively an automatic entry (e.g., computer 218 automatically accessing a particular field of a license associated with the application program and extracting the product ID therefrom). The client computer 218 can also include a product ID validator 222 which validates, during installation of the application program, the product ID 212. In one embodiment, the validation can be performed using the pairing-based decryption techniques and/or systems described herein. If the validator 222 determines that the product ID is valid, an appropriate course of action can be taken (e.g., an installation program on software media 210 allows the application to be installed on computer 218). However, if the validator 222 determines that the product ID is invalid, a different course of action can be taken (e.g., the installation program terminates the installation process preventing the application program from being installed).

In one embodiment, the product ID validator 222 can also optionally authenticate the software media (e.g., application program) based on the product ID 212. This authentication verifies that the product ID 212 entered at computer 218 corresponds to the particular copy of the application be accessed, for example. As an example, the authentication may be performed at different times, such as during installation, or when requesting product support or an upgrade. Alternatively, in this embodiment, the authentication may be performed at a remote location (e.g., at a call center when the user of client computer 218 calls for technical support, the user may be required to provide the product ID 212 before receiving assistance).

In one embodiment, if an application program manufacturer desires to utilize the authentication capabilities of the product ID, the product ID generated by generator 204 for each copy of an application program can be unique. As an example, unique product IDs can be created by assigning a different initial number or value to each copy of the application program (e.g., this initial value is then used as a basis for generating the product ID). The unique value associated with the copy of the application program can be optionally maintained by the manufacturer as an authentication record 208 (e.g., a database or list) along with an indication of the particular copy of the application program. The indication of the copy can be, for example, a serial number embedded in the application program or on software media 210, and may be hidden in any of a wide variety of conventional manners. Alternatively, for example, the individual number itself may be a serial number that is associated with the particular copy, thereby allowing the manufacturer to verify the authenticity of an application program by extracting the initial value from the product ID and verifying that it is the same as the serial number embedded in the application program or software media 210.

A method can be devised that allows a mathematical pairing to be determined for a curve, where a first set of elements submitted as a cryptographic key (e.g., points on an elliptic curve) can be compared with known points on the curve, and used for cryptographic purposes. Effective cryptosystems are typically based on groups where the Discrete Logarithm Problem (DLP) for the group is hard (e.g., difficult to calculate), such as a group of points from the elliptic curve. The DLP can be formulated in a group, which is a collection of elements together with a binary operation, such as a group multiplication. As an illustrative example, the DLP may be: given an element g in a finite group G and another element h that is an element of G, find an integer x such that $g^x=h$. Generating pairings for use in cryptography typically requires a lot of underlying multiplications in a finite field over which the elliptic curve is defined.

Figure 3:
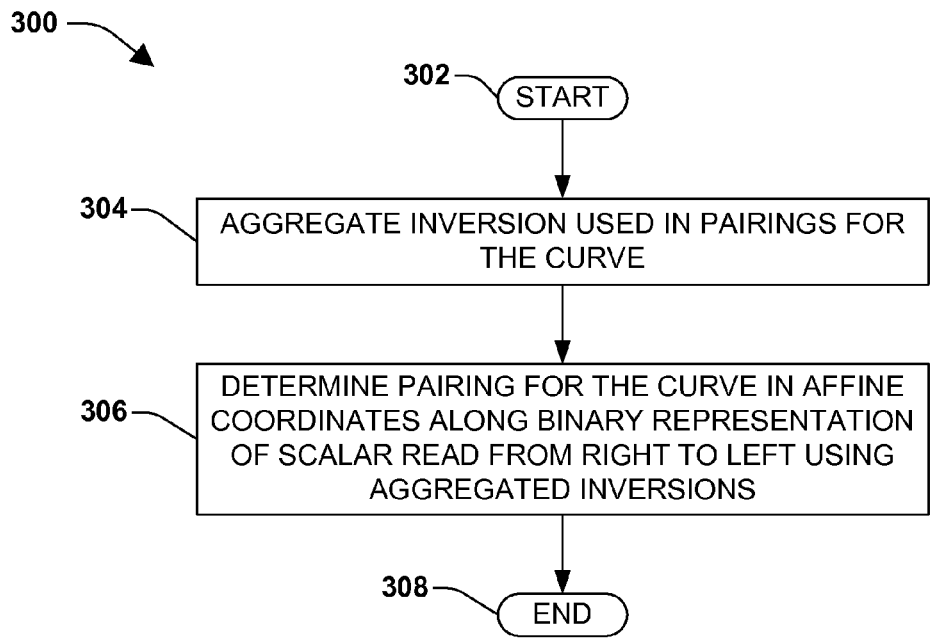
FIG. 3 is a flow-chart diagram of an exemplary method for determining mathematical pairings for a curve for use in cryptography.

FIG. 3 is a flow-chart diagram of an exemplary method 300 for determining mathematical pairings for a curve for use in cryptography. The exemplary method 300 begins at 302 and involves aggregating a plurality of inversions used in determining the mathematical pairings for the curve, at 304.

Because pairing operations on an elliptic curve utilize a lot of underlying multiplications in the finite field, in order to make pairing operations more efficient, for example, a number of multiplications can be mitigated, and/or efficiencies can be created in other pairing operations.

In one embodiment, in the finite field for the curve, both multiplications and inversions (e.g., identifying multiplicative inverses or reciprocals) are performed for the pairing operation. Inversions are typically more computationally expensive to perform than the multiplications. For example, an inversion to multiplication ratio for computations can often be eighty to one, as a coordinate system used for the curve points is commonly changed from affine to projective in order to reduce a number of inversions. As an illustrative example of an inversion determination, to approximate a multiplicative inverse of a nonzero real number x, a number y can be repeatedly replaced with $2y-xy^2$. In this example, when changes to y remain within a threshold, y is an approximation of the multiplicative inverse of x. It will be appreciated that this example is merely for illustration purposes, and that there are other techniques for determining inversions, particularly for other types of numbers, such as complex numbers.

In the exemplary method 300, for example, while working in the affine coordinate system, a number of inversions can be greatly mitigated by combining the inversions, and determining them at a same time. In one embodiment, when using affine coordinates for the pairing computation, respective doubling (e.g., multiplication) and addition acts use a finite field inversion to compute a slope value for a line that is evaluated in a subsequent act. In this embodiment, the inversions can be aggregated, for example, using "Montgomery's trick" to replace I finite field inversions by a single inversion and 3(I−1) multiplications.

As an illustrative example of Montgomery's trick, in order to determine inversions for elements x and y, instead of determining two inversions the product xy can be determined and its inverse computed. In this example, the inverse of x and y can then be determined by the multiplications: $x^{-1}=(xy)^{-1}y$, and $y^{-1}=(xy)^{-1}x$. In this way, in this example, the inversions of the two elements x and y can be determined by one inversion and three multiplications. Where inversions are to be determined for n elements, merely one inversion and 3(n−1) multiplications can be performed. Therefore, in one embodiment, where the pairing computation comprises a plurality of inversions (n), the n inversions can be aggregated into one inversion.

In one embodiment, let $[a_1, \ldots, a_s]$ be a sequence of elements of which reciprocals $[a_1^{-1}, \ldots, a_s^{-1}]$ are to be computed. The reciprocals can be computed by first computing a product $a_1 \ldots a_s$, its reciprocal $(a_1 \ldots a_s)^{-1}$, the products $a_1 a_{i+1} a_s$ for $1 \leq i \leq s$, and the reciprocals of single elements by $$a_i^{-1}=(a_1 a_{i-1} a_{i+1} a_s)(a_1 a_s)^{-1}.$$

The acts can be performed in 1 inversion and 3(s−1) multiplications. That is, s inversions can be replaced by 1 inversion and 3(s−1) multiplications.

In one embodiment, the product $a_1 a_2 \ldots a_s$ can be computed in a binary tree with s−1 multiplications, for example, where the s−1 products can be stored for use in the inversion aggregation. Further, in this embodiment, the reciprocals $(a_1 a_2 \ldots a_s)^{-1}$ are computed, and subsequent reciprocals are computed along a same tree with 2(s−1) multiplications.

Returning to the exemplary method 300 of FIG. 3, at 306, the mathematical pairings are determined for the curve in affine coordinates along a binary representation of a scalar read from right to left using the aggregated inversions. When computing a Tate pairing for a curve a typical Miller loop algorithm goes through the scalar from left to right (or from top down). As an illustrative example, assume that k>1 so that denominators in a Miller algorithm are eliminated.

For the following exemplary embodiment and illustrative examples utilize the following notations: Let p>3 be a prime and $F_q$ be a finite field of characteristic p. Let E be an elliptic curve defined over $F_q$ having a Weierstrass equation $E: y^2 = x^3 + ax + b$. For a prime r with $r | \#E(F_q)$, let k be an embedding degree of E with respect to r, i.e. k is a smallest positive integer with $r | q^k - 1$. A set of r-torsion points on E can be denoted by E[r] and a set of $F\_(q^i)$-rational r-torsion points by $E(F\_(q^i))[r]$ for i>0. Let $\phi\_q$ be a q-power Frobenius endomorphism on E.

Further, define $G\_1 = E[r] \cap \ker(\phi\_q - [1]) = E(F\_q)[r],$ $G\_2 = E[r] \cap \ker(\phi\_q - [q]) \subseteq E(F\_(q^k))[r].$ Let k>1. A reduced Tate pairing is a map:

$e\_r = G\_1 \times G\_2 \rightarrow G\_3,$ $(P,Q) \mapsto f\_(r,P)(Q)^{((q^k-1)/r)},$ where $f\_(r,P) \in F\_q(E)$ is a function with divisor r(P)−r(O). Denote the function in $F\_q(E)$ given by a line through two points R and S on E by $l\_(R,S)$. If R=S, then the line is given by the tangent to the curve passing through R.

The following illustrates one embodiment of a typical Miller loop for computing a Tate pairing (using the above notations):

| | |
|---|---|
| Input: | $P \in G_1, Q \in G_2, r = (r_{m-1}, \ldots, r_0)_2$ |
| Output: | $e_r(P, Q) = f_{r,P}(Q)^{\frac{q^k-1}{r}}$ |
| 1: | $R \leftarrow P, f \leftarrow 1$ |
| 2: | for (i ← m − 2; i ≥ 0; i − −) do |
| 3: | $f \leftarrow f^2 \cdot l_{R,R}(Q)$ |
| 4: | $R \leftarrow [2]R$ |
| 5: | if ($r_i = 1$) then |
| 6: | $f \leftarrow f \cdot l_{R,P}(Q)$ |
| 7: | $R \leftarrow R + P$ |
| 8: | end if |
| 9: | end for |
| 10: | $f \leftarrow f^{\frac{q^k-1}{r}}$ |
| 11: | return f |

In this illustrative example, Lines 3 and 4 in the above algorithm together are commonly called a doubling act, and Lines 6 and 7 are commonly called an addition act.

In one embodiment of the act 306 of the exemplary method 300, the Miller loop algorithm can be modified, where the binary representations are read from right to left (or bottom up). The following is an illustrative example of the right to left (or bottom up) approach:

| | |
|---|---|
| Input: | $P \in G_1, Q \in G_2, r = (r_{m-1}, \ldots, r_0)_2$ |
| Output: | $e_r(P, Q) = f_{r,P}(Q)^{\frac{q^k-1}{r}}$ |
| 1: | $R \leftarrow P, f_R \leftarrow 1$ |
| 2: | $V \leftarrow O, f_V \leftarrow 1$ |

-continued

```
3:          for (i ← 0; i ≤ m − 1; i + +) do
4:              if (r_i = 1) then
5:                  f_V ← f_V · f_R · l_{V,R}(Q)
6:                  V ← V + R
7:              end if
8:              f_R ← f_R^2 · l_{R,R}(Q)
9:              R ← [2]R
10:         end for 11:         
            f ← f_V^{\frac{q^k-1}{r}}

12:         return f
```

In this illustrative example, the doubling act is in Lines 8 and 9, and the addition act in Lines 5 and 6. The above algorithm does m doubling acts and h addition acts. In this example, although the loop can be done m times, merely m−1 doubling acts are used, a last one may not influence the computation.

Further, in this embodiment, when using the "bottom-up" approach, the addition acts can be postponed in line 5 and 6 (in the bottom-up algorithm, above). Here, for example, pairs of relevant function values and corresponding points $(f_R, R)$ can be stored in a list L (e.g., in a database), and a computation of a final function value can be computed later. As an illustrative example, the following algorithm provides a bottom-up approach with postponement of the addition acts, by storing the values and points (see Line 5 of the following algorithm), and carries out the computation of the final function value later (see Line 10):

```
Input:      P ∈ G_1, Q ∈ G_2, r = (r_{m−1}, ..., r_0)_2

Output:     
            e_r(P, Q) = f_{r,P}(Q)^{\frac{q^k-1}{r}}

1:          R ← P, f_R ← 1
2:          L ← [ ]
3:          For (i ← 0; i ≤ m − 1; i + +) do
4:              if (r_i = 1) then
5:                  Append (f_R, R) to L.
6:              end if
7:              f_R ← f_R^2 · l_{R,R}(Q)
8               R ← [2]R
9:          End for
10:         Compute f_{r,P}(Q) from the pairs in L.

11:         
            f ← f^{\frac{q^k-1}{r}}

12:         return f
```

In this example, the approach can be more efficient than the present top-down algorithm, as postponing the computation allows to save costs equivalent to h−1) multiplications in $F\_(q^k)$.

In one embodiment, using the aggregated inversions, line 10 of the above algorithm, "Compute $f_{r,P}(Q)$ from the pairs in L", can also be carried out along a binary tree. In this embodiment, in each layer of the binary tree, the aggregated inversion technique can be applied. In this way, for example, as described above, (h−1) inversions can be substituted for [log (h)] inversions and 3(h−1−[log(h)]) multiplications when computing mathematical pairings for the curve. Therefore, the number of inversions is dramatically reduced while a small number of multiplications are added, which are computationally cheaper.

Having computed the mathematical pairings for the curve, the exemplary method 300 of FIG. 3 ends at 308.

Figure 4:
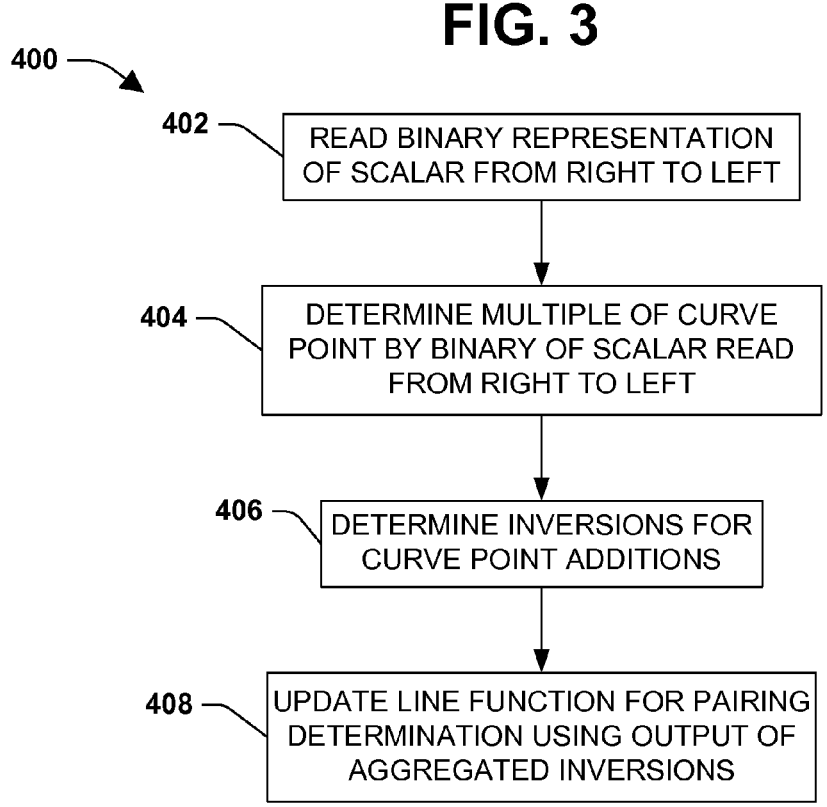
FIG. 4 is a flow diagram illustrating one embodiment of an implementation of portions of one or more of the methods described herein.

FIG. 4 is a flow diagram illustrating one embodiment 400 of an implementation of portions of one or more of the methods described herein. Determining the mathematical pairings for the curve in affine coordinates along a binary representation of a scalar read from right to left using the aggregated plurality of inversions can comprise reading a binary representation of the scalar from right to left, at 402. As described above, the binary representation of the scalar can be read from right to left, for example, when the curve point coordinates are in the affine space.

At 404, a multiple of a curve point is determined by computing a scalar multiple of a curve point, where the scalar multiple, for example, is a m-fold sum of the curve point in affine space. That is, for example, the multiplication acts of the bottom up approach algorithm can be performed, a plurality of curve point multiples can be determined. This act is often called the doubling act, for example, where for (i←0; i≤m−1; i++) do . . . $f_R ← f_R^2 · l_{R,R}(Q)$, and R←[2]R (using the above described notations). Notably, in this embodiment, the multiplication is performed on the coordinates in affine space, unlike current commonly used techniques that switch the coordinates to projective space in order to mitigate a number of inversions, for example.

At 406, the inversions of the additions of the curve point can be determined for the finite field. That is, for example, while reading the scalar from right to left, curve points are added depending on the binary representation of the scalar. In this example, for the curve point additions, inversions are determined in the finite field. As an example, an inversion is often referred to as a multiplicative inverse, or a reciprocal. As described above, the inversions are aggregated, for example, into a single inversion for respective acts in the additive process. In this way, a plurality of inversions are combined at respective levels in the binary tree representation of the pairing portion of the algorithm, for example, merely using one inversion for respective levels.

At 408, an output of the aggregated inversion is determined, for example, as a slope value for a line function, and the line function is updated with the outputted slope value. For example, when computing pairings for elements (e.g., curve points) for a curve over a finite field, line functions are evaluated to compute the pairings, such as to a new element in a different group. As such, in this example, the aggregated inversion output is used as the slope value for the line function, for example, at respective levels of the binary tree representation, and the line is evaluated with the slope value to determine the pairings.

Figure 5:
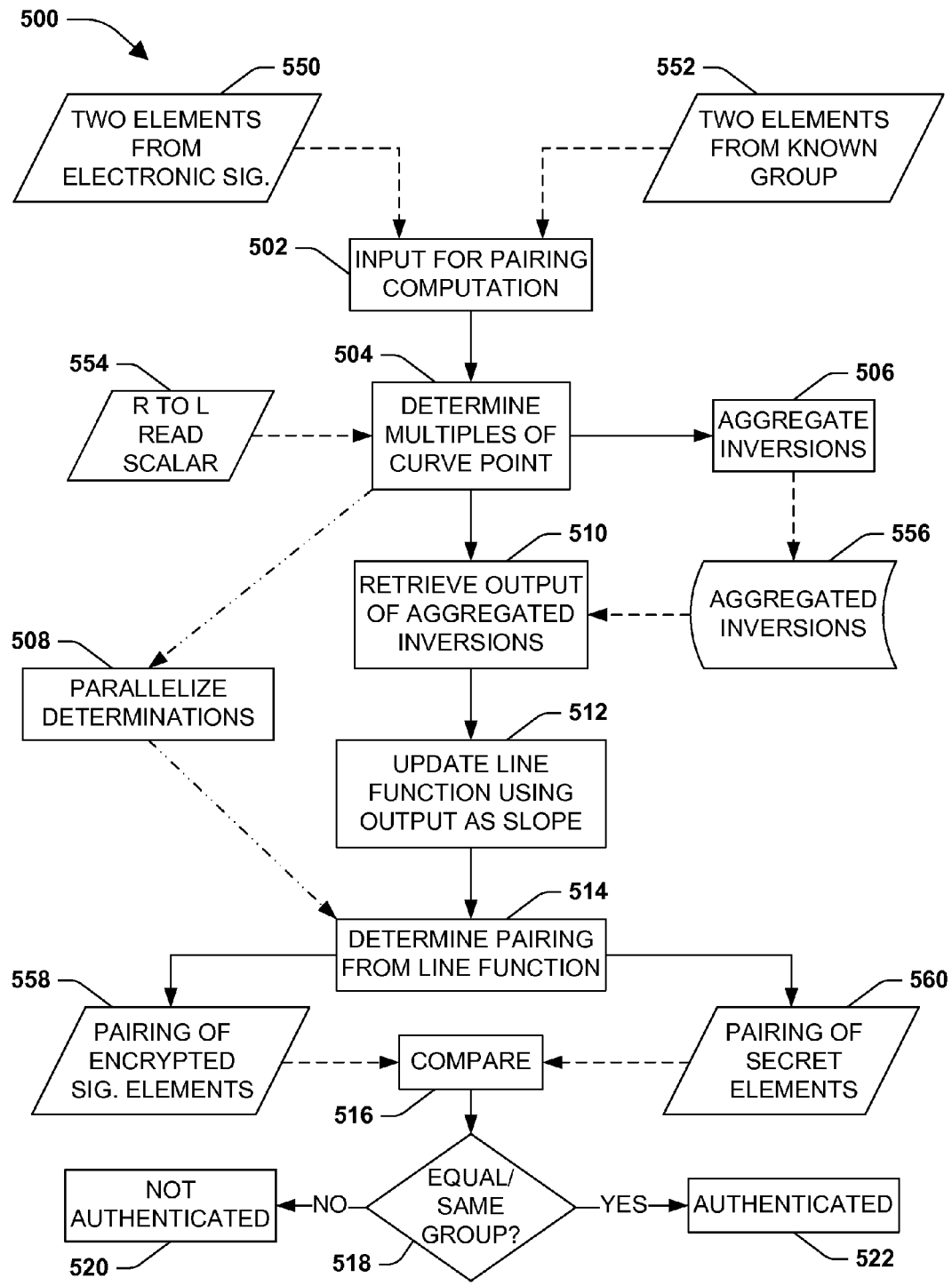
FIG. 5 is a flow diagram illustrating an exemplary implementation of one or more of the techniques and/or systems described herein.

FIG. 5 is a flow diagram illustrating one embodiment 500 of an implementation of one or more of the techniques and/or systems described herein. In this embodiment 500, two elements are received from an electronic signature 550, such as submitted by a user to authenticate their identity, as input for a pairing computation, at 502. Further, two elements from a known group 552 (e.g., a shared secret cryptographic key for security) are submitted as input for pairing computation. In this embodiment, pairings will be computed for the elements from the signature 550 and pairings will be computed for the elements from the group 552.

At 504, multiples of the curve points submitted as elements of the group are determined, as described above. In this embodiment 500, binary representations of the scalar read from right to left 554 are used to determine the multiples of the curve point. The inversions are aggregated from the multiples at 506, into a single inversion, and are stored 556, such as in a remote or local database. In one embodiment, the scalar, which is read from right to left in a binary representation 554, may be comprised in a cryptographic key, such as a public key.

In one embodiment, the determining of pairings for the curve in affine coordinates along a binary representation of a scalar read from right to left can be parallelized on a plurality of processors, at 508. For example, computers commonly have multi-core processors, which may allow the computations to be parallelized on more than one core in order to speed up the computation and free resources. In one embodiment, the parallelization may comprise two or more instances for the determination of the multiples of the curve point on two or more processors, for example, at a same time.

At 510, an output for the aggregated inversions is retrieved, for example, as a slope value. As described above, an aggregated inversion may be used at respective levels in a binary tree representation of the additive act in the pairings computations. Further, in one embodiment, the stored aggregated inversions 556 may be reused in a subsequent pairing computation of a set of coordinates in affine space. As an example, the aggregated inversions can be retrieved from the remote or local database and reused. In this way, a number of computations can be mitigated by reducing the inversion aggregation act.

In one embodiment, the aggregated inversion may be reused when a first curve point that was used in determining the aggregated inversions is a same element as a second curve point for which the aggregated inversions are reused. That is, the aggregated inversions can be determined using a curve point submitted as an element in the pairings computation. In this embodiment, if a second set of elements submitted after the first set is computed, and the second set comprises an element that is the same as the element from the first set, the aggregated inversions may be reused in computing the pairings for the second set of elements, for example.

At 512, the line function is updated using the aggregated inversions output as a slope value. In one embodiment, the output of the aggregated inversions may be used to update a coefficient in the function of the line used for the pairing computation. At 514, the pairings can be determined for the elements, for example, by evaluating the updated line function, resulting in a mathematical pairing for the encrypted signature authorization element 558, and a mathematical pairing for the secret elements 560.

At 516, the respective pairings 558, 560, can be compared to determine whether they are equal, for example, to determine authenticity of the submitted electronic signature. In this embodiment, 500, if the elements are found not to be equal, at 518, (or they are not from the same group) the submitted signature is not authenticated, at 520. If the elements are found to be equal, at 518, (and from the same group) the submitted signature is authenticated, at 522. In this way, for example, the computation of the pairings for elements can be used for cryptographic purposes, and the one or more techniques described herein may be used to facilitate a more efficient and faster pairing computation.

Figure 6:
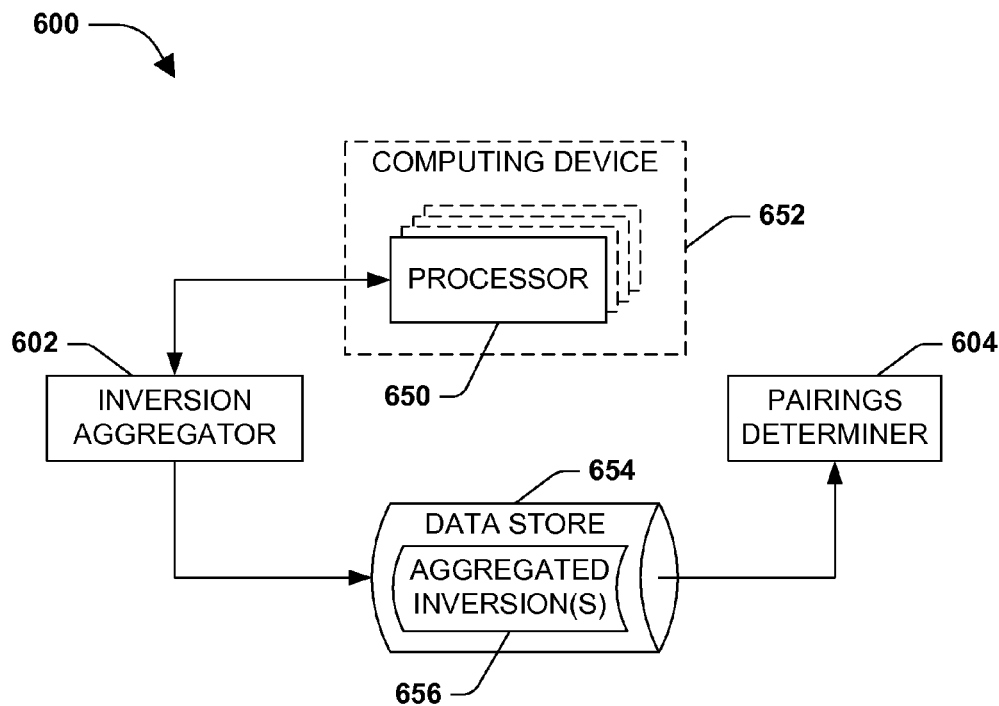
FIG. 6 is a component block diagram illustrating an exemplary system for determining mathematical pairings for a curve for use in cryptography.

One or more systems may be devised for determining mathematical pairings for a curve, in order to compare submitted elements for cryptographic purposes, for example. Because the computation of pairings for use in cryptography can require a lot of underlying multiplications and inversions in a finite field over which the elliptic curve is defined, the one or more systems described herein can be devised to mitigate the time and resources used to compute these pairings. FIG. 6 is a component block diagram illustrating an exemplary system 600 for determining mathematical pairings for a curve for use in cryptography.

The exemplary system 600 comprises an inversion aggregation component 602, which aggregates inversions that are used to determine the mathematical pairings for the curve. The inversion aggregation component 602 is operably coupled with one or more programmed processors 650, which reside in one or more computing devices, and with a data storage component 654 that can store one or more of the aggregated inversions 656. Further, in the exemplary system 600, a mathematical pairings determination component 604 is operably coupled with the data storage component 654, and can determine the mathematical pairings for the curve in affine coordinates along a binary representation of a scalar read from right to left using the aggregated inversions 656 stored thereon.

In one embodiment, the inversion aggregation component 602, pairings determination component 604, and data storage component 654 may be comprised in a same computing device, such as the computing device 652 that comprises the one or more processors 650. Alternatively, the components of the system may be disposed on different devices, or in some combination thereof.

In one embodiment, the inversion aggregation component 602 can be configured to aggregate the plurality of inversions into a single inversion for use in the mathematical pairing determination. For example, respective inversions for a level of a binary representation of multiples of the curve point can be combined by the inversion aggregation component 602 into a single inversion for that level. In this example, the combined (aggregated inversion, e.g., 656) can be stored in the data storage component 654, and used by the pairings determination component 604 for computing pairings.

Figure 7:
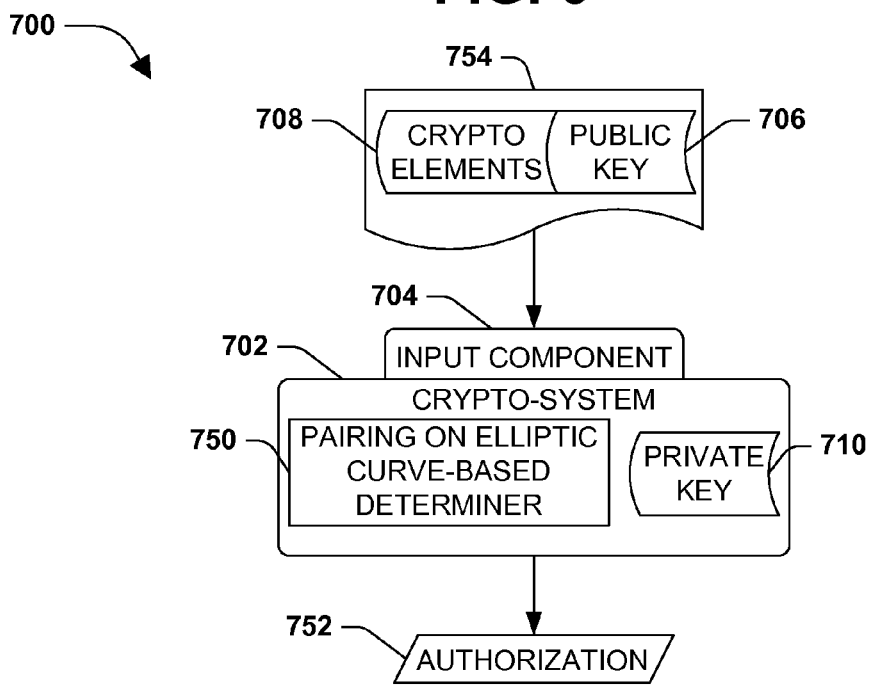
FIG. 7 is a component block diagram illustrating an exemplary implementation of one or more of the systems described herein.

FIG. 7 is a component block diagram illustrating one embodiment 700 of an exemplary implementation of the one or more systems described herein. A cryptographic system 702, such as illustrated in FIGS. 1 and 2 (e.g., 104, 222), may comprise a pairing on an elliptic curve-based determiner 750, for example, which utilizes one or more implementations of the systems described herein. Further, the cryptographic system 702 can comprise a group that is publically known (e.g., by knowing the curve) that utilizes the cryptographic system (e.g., for authentication, security, encryption, etc.).

In this exemplary embodiment 700, an input component 704, such as a component that can read an incoming document that uses cryptographic authentication, receives a document 754 that comprises cryptographic elements 708 and a public key 706. As an example, the document 754 may be an encrypted document that is being submitted to a decryptor (e.g., in order to be read), the cryptographic elements 708 are points on a curve (e.g., group elements comprised from the group if the document is authentic), and a scalar used in the computation of the pairings. The public key is usually a point on the curve, while the secret key is a scalar.

In this embodiment 700, the pairing on an elliptic curve-based determiner 750 can determine a pairing for the submitted cryptographic elements 708, and for elements from the private key 710, to determine whether the submitted document is authentic, for example. That is, if the document is authentic, for example, the cryptographic elements 708 will match to the same element as those from the private key 710, when pairings are computed for each using the scalar from the public key 706. In this way, the cryptographic system can output an authentication 752 for the document 754, for example, in order for the document 754 to be decrypted for viewing.

Figure 8:
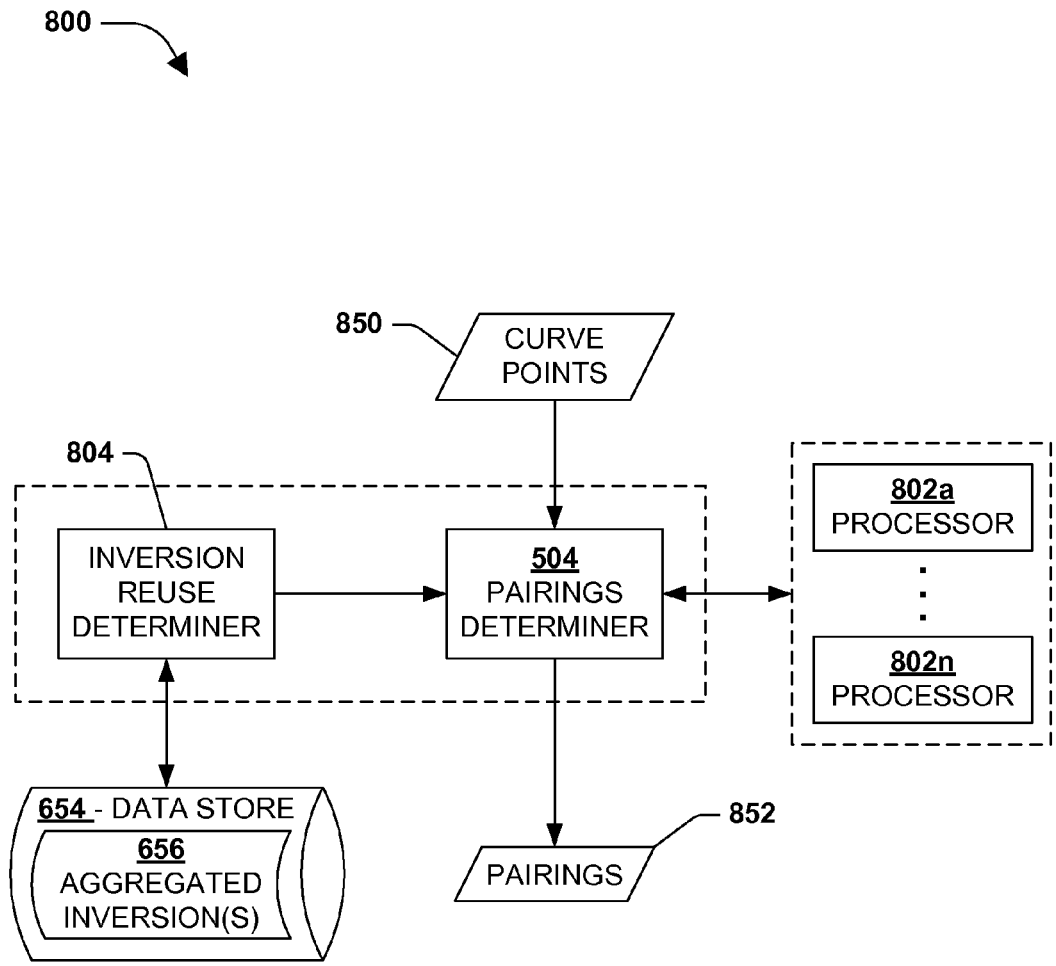
FIG. 8 is a component block diagram illustrating an exemplary implementation of one or more of the systems described herein.

FIG. 8 is a component block diagram illustrating another exemplary embodiment 800 of an implementation of the one or more systems described herein. In this embodiment 800, the mathematical pairings determination component 504 is operably coupled with a plurality of processors 802a-802n that can parallelize a determination of addition relationships for multiples of the curve point 850 in affine coordinates along a binary representation of a scalar read from right to left. That is, for example, various parts of the pairings determination (e.g., the addition acts) can be run on several processors at a same time in order to reduce an overall time for computing the pairings 852.

Further, in the exemplary embodiment 800, the mathematical pairings determination component 504 can be configured to reuse the aggregated plurality of inversions 656, such as where a first curve point that was used in determining the aggregated plurality of inversions is a same element as a second curve point for which the aggregated inversions are reused. In this embodiment, an inversion reuse determination component 804 can determine whether the second curve point is the same element as the first curve point, such as by comparing a stored version of the first curve point to a second one received 850. Additionally, the inversion reuse determination component 804 can retrieve the aggregated inversions 656 from the data storage component 654 that correspond to the first curve point. In this way, the retrieved inversions 656 can be reused by the pairing determination component 504, for example, instead of computing new aggregated inversions.

Figure 9:
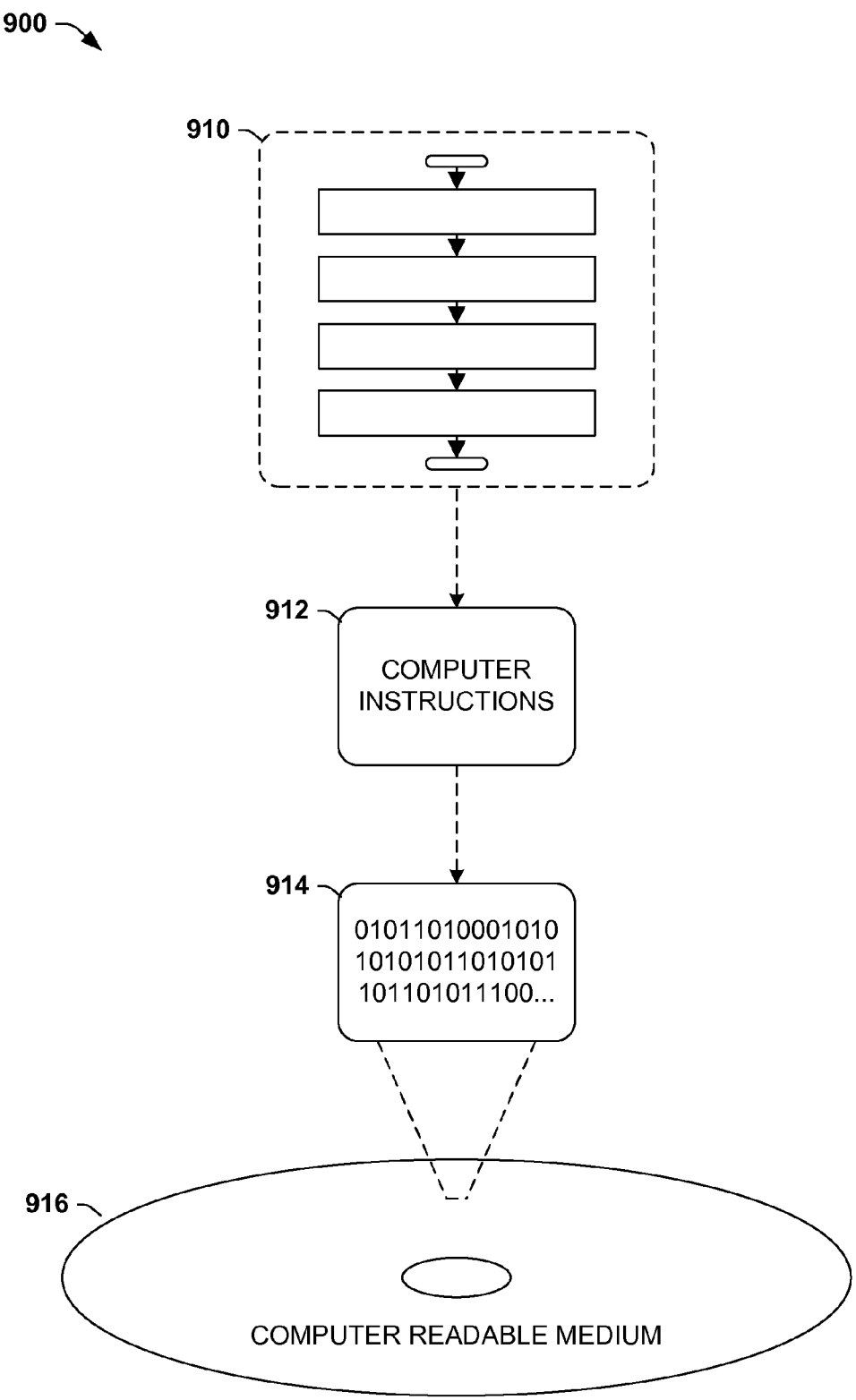
FIG. 9 is an illustration of an exemplary computer-readable medium that may be devised to implement one or more of the methods and/or systems described herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 910, the processor-executable instructions 912 may be configured to perform a method, such as the exemplary method 300 of FIG. 3, for example. In another such embodiment, the processor-executable instructions 912 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
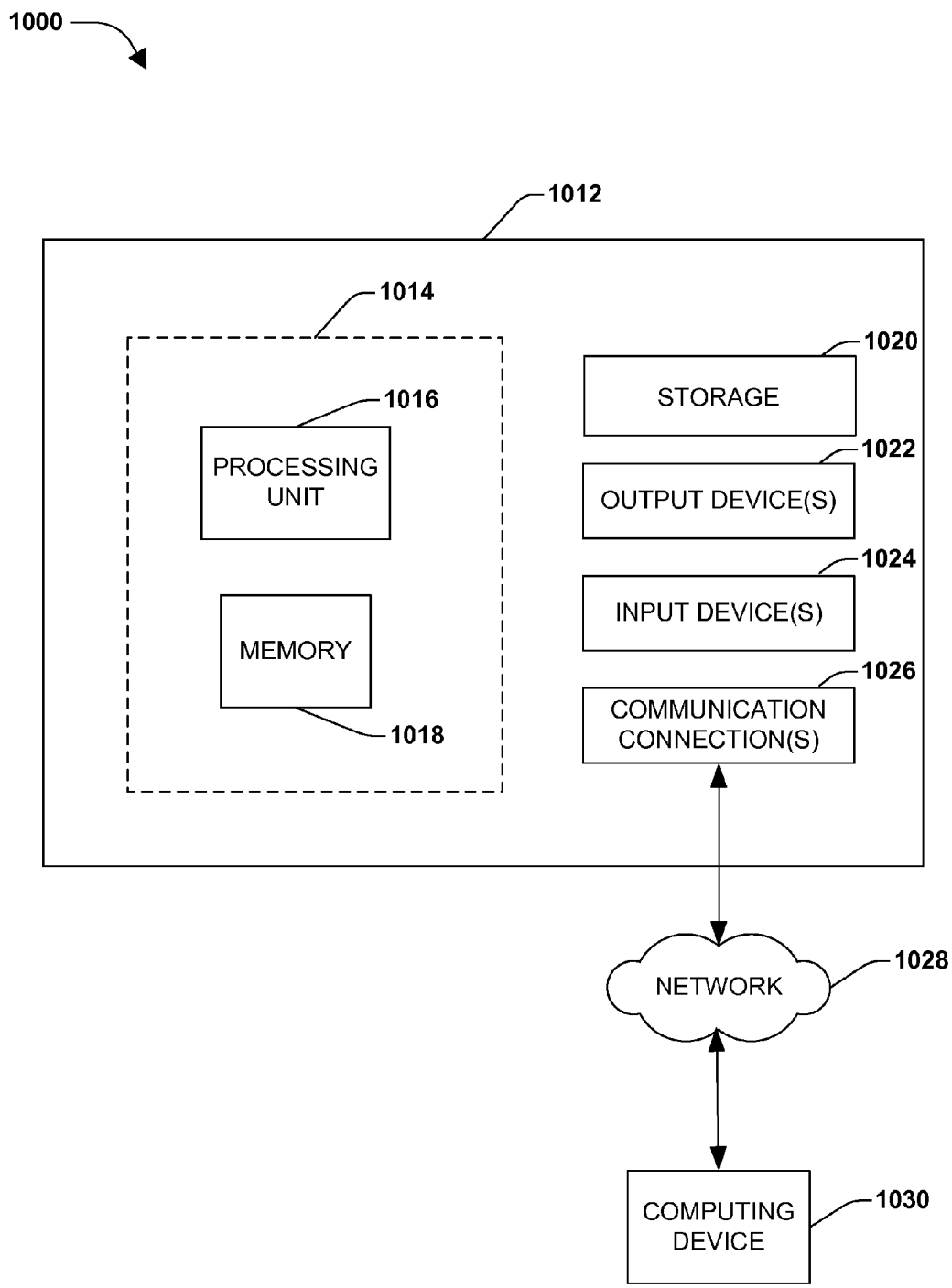
FIG. 10 is a component block diagram of an exemplary environment that may be devised to implement one or more of the methods and/or systems described herein.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for determining mathematical pairings for use in cryptography, comprising:
   aggregating a plurality of inversions associated with a first set of elements to obtain an aggregated plurality of inversions, the first set of elements comprising a first curve point;
   determining mathematical pairings associated with the first set of elements using the aggregated plurality of inversions;
   receiving a second set of elements;
   determining that a second curve point comprised in the second set of elements is a same element as the first curve point; and
   reusing at least some of the aggregated plurality of inversions in determining mathematical pairings associated with the second set of elements, at least one of the determining mathematical pairings associated with the first set of elements or the determining mathematical pairings associated with the second set of elements comprising determining mathematical pairings in affine coordinates along a binary representation of a scalar readable from right to left, at least some of the method implemented in hardware.

2. The method of claim 1, the aggregating comprising aggregating the plurality of inversions into a single inversion.

3. The method of claim 1, at least one of the mathematical pairings associated with the first set of elements or the mathematical pairings associated with the second set of elements corresponding to a curve.

4. The method of claim 1, the cryptography associated with an authentication of at least one of a machine or a user.

5. The method of claim 1, the cryptography associated with a generation of a product ID.

6. The method of claim 1, comprising parallelizing the determining mathematical pairings associated with the first set of elements and the determining mathematical pairings associated with the second set of elements on a plurality of processors.

7. The method of claim 1, an output of the aggregated plurality of inversions comprising a slope value associated with an updating of a line function in at least one of the determining mathematical pairings associated with the first set of elements or the determining mathematical pairings associated with the second set of elements.

8. A system for determining mathematical pairings for use in cryptography, comprising:
   one or more processing units; and
   memory comprising instructions that when executed by at least some of the one or more processing units, perform a method comprising:
      aggregating a plurality of inversions associated with a first set of elements to obtain an aggregated plurality of inversions, the first set of elements comprising a first curve point;
      determining mathematical pairings associated with the first set of elements using the aggregated plurality of inversions;
      receiving a second set of elements;
      determining that a second curve point comprised in the second set of elements is a same element as the first curve point; and
      reusing at least some of the aggregated plurality of inversions in determining mathematical pairings associated with the second set of elements, at least one of the determining mathematical pairings associated with the first set of elements or the determining mathematical pairings associated with the second set of elements comprising determining mathematical pairings in affine coordinates along a binary representation of a scalar readable from right to left.

9. The system of claim 8, the aggregating comprising aggregating the plurality of inversions into a single inversion.

10. The system of claim 8, at least one of the mathematical pairings associated with the first set of elements or the mathematical pairings associated with the second set of elements corresponding to a curve.

11. The system of claim 8, the cryptography associated with an authentication of at least one of a machine or a user.

12. The system of claim 8, the cryptography associated with a generation of a product ID.

13. The system of claim 8, the method comprising parallelizing the determining mathematical pairings associated with the first set of elements and the determining mathematical pairings associated with the second set of elements on a plurality of processors.

14. The system of claim 8, an output of the aggregated plurality of inversions comprising a slope value associated with an updating of a line function in at least one of the determining mathematical pairings associated with the first set of elements or the determining mathematical pairings associated with the second set of elements.

15. A computer readable device comprising instructions that when executed perform a method, comprising:
   aggregating a plurality of inversions associated with a first set of elements to obtain an aggregated plurality of inversions, the first set of elements comprising a first curve point;
   determining mathematical pairings associated with the first set of elements using the aggregated plurality of inversions;
   receiving a second set of elements;
   determining that a second curve point comprised in the second set of elements is a same element as the first curve point; and
   reusing at least some of the aggregated plurality of inversions in determining mathematical pairings associated with the second set of elements, at least one of the determining mathematical pairings associated with the first set of elements or the determining mathematical pairings associated with the second set of elements comprising determining mathematical pairings in affine coordinates along a binary representation of a scalar readable from right to left.

16. The computer readable device of claim 15, the aggregating comprising aggregating the plurality of inversions into a single inversion.

17. The computer readable device of claim 15, at least one of the mathematical pairings associated with the first set of elements or the mathematical pairings associated with the second set of elements corresponding to a curve.

18. The computer readable device of claim 15, the method associated with an authentication of at least one of a machine or a user.

19. The computer readable device of claim 15, the method associated with a generation of a product ID.

20. The computer readable device of claim 15, an output of the aggregated plurality of inversions comprising a slope value associated with an updating of a line function in at least one of the determining mathematical pairings associated with the first set of elements or the determining mathematical pairings associated with the second set of elements.

* * * * *